United States Patent
Gogins (10) Patent No.: US 7,121,160 B2
(45) Date of Patent: Oct. 17, 2006

(54) MECHANICAL TRANSMISSION

(76) Inventor: Laird B. Gogins, 299 North Center, #306, Salt Lake City, UT (US) 84103

( * ) Notice: Subject to any disclaimer, the term of this patent is extended or adjusted under 35 U.S.C. 154(b) by 0 days.

(21) Appl. No.: 10/884,054

(22) Filed: Jul. 2, 2004

(65) Prior Publication Data

US 2005/0029037 A1 Feb. 10, 2005

Related U.S. Application Data (63) Continuation of application No. 09/975,647, filed on Oct. 10, 2000.

(51) Int. Cl.
*F01L 13/00* (2006.01)
*F16H 53/04* (2006.01)
*F16H 21/00* (2006.01)
*F16H 29/00* (2006.01)

(52) U.S. Cl. .................. 74/122; 74/20; 74/22 R; 74/123; 74/568 R (58) Field of Classification Search ............ 74/20, 74/84, 125.5, 122, 123, 124, 568 R, 22 R, 74/21, 24
See application file for complete search history.

(56) References Cited

U.S. PATENT DOCUMENTS

| | | | |
|---|---|---|---|
| 629,389 A | 7/1899 | Otto | |
| 3,646,822 A * | 3/1972 | Pocaterra | 74/53 |
| 3,727,366 A | 4/1973 | Schlueter et al. | |
| 3,803,931 A | 4/1974 | Bianchini et al. | |
| 4,109,539 A * | 8/1978 | Feleus | 74/36 |
| 4,475,495 A * | 10/1984 | Lydell | 123/197.3 |
| 4,487,085 A | 12/1984 | Collins | |
| 4,503,724 A * | 3/1985 | Ward | 74/143 |
| 4,565,105 A * | 1/1986 | Peterson | 74/119 |
| 4,630,839 A | 12/1986 | Seol | |
| 4,635,494 A * | 1/1987 | Conklin | 74/119 |
| 4,936,155 A | 6/1990 | Gogins | |
| 5,142,937 A * | 9/1992 | Takahara et al. | 74/594.3 |
| 5,239,879 A * | 8/1993 | Economou | 74/69 |
| 5,392,664 A * | 2/1995 | Gogins | 74/117 |
| 5,603,240 A * | 2/1997 | Klovstad et al. | 74/120 |
| 6,044,718 A * | 4/2000 | Lester | 74/112 |
| 6,068,570 A | 5/2000 | Han | |
| 6,537,168 B1 * | 3/2003 | Han | 475/8 |
| 6,595,084 B1 | 7/2003 | Park | |

FOREIGN PATENT DOCUMENTS

JP  01229156 A  *  9/1989

* cited by examiner

*Primary Examiner*—Richard Ridley
*Assistant Examiner*—Colby Hansen
(74) *Attorney, Agent, or Firm*—Morriss O'Bryant Compagni, PC (57) ABSTRACT

A constant power mechanical transmission with seamless, ripple free, infinitely variable torque multiplying outputs comprises an input shaft and an output shaft. The input shaft is coupled to a pair of oscillating levers whereby rotation of the input shaft causes oscillation of the oscillating levers in opposite directions. The oscillating levers are linked to the output shaft with one-way clutches in order to cause rotation of the shaft upon movement of the oscillating levers. The rotational speed of the output shaft can be infinitely varied by changing the throw of the oscillating levers.

25 Claims, 10 Drawing Sheets

*(PRIOR ART)*

Fig. 13

MECHANICAL TRANSMISSION

This patent application is a continuation of U.S. patent application Ser. No. 09/975,647, now U.S. Pat. No. 6,779,415, which claims benefit of U.S. Provisional Patent Application Ser. No. 60/238,888, filed on Oct. 10, 2000.

BACKGROUND OF THE INVENTION

1. Technical Field

This invention relates to mechanical apparatus for changing the speed and torque of the output shaft of a prime mover relative to its input shaft. More specifically, this invention is directed to an apparatus for providing up to an infinite number of seamless, ripple free changes of speed and torque from a power source such as a gas or diesel engine, an electric motor, a jet engine, a steam engine, the crank of a bicycle, or the like.

2. Background Art

Historically, significant efforts have been directed to the provision of transmission assemblies adapted for changing the speed and torque of a power source. Many of these assemblies have involved the use of ratchet drives, eccentrically-oriented cam assemblies, and variable length lever arms. Representative of past efforts in this regard are the structures disclosed in the following issued patents: U.S. Pat. No. 629,389; U.S. Pat. No. 3,803,931; U.S. Pat. No. 4,630,830; U.S. Pat. No. 4,487,085; U.S. Pat. No. 6,068,570; U.S. Pat. No. 4,936,155.

For example, U.S. Pat. No. 629,389 discloses a bicycle in which it is stated, "The gear may be changed by substituting larger or smaller pulleys." Thus, one would have to get off the bike, take out his tool kit, take-off the pulleys and attach new and different pulleys to change gear ratios. Furthermore, U.S. Pat. No. 629,389 is a one speed transmission.

U.S. Pat. No. 4,936,155 discloses a transmission to provide constant power, speed changing and torque multiplication. The invention utilizes "a variable throw cam and cam follower system to provide ripple free output speeds and wide ranging torques." The cam follower wheel makes point contact with said cam. With this configuration, the cam follower of the present transmission makes line contact with the cam, thus limiting torque and power capacity.

U.S. Pat. No. 3,803,931 discloses "a variable speed transmission device comprises an output shaft rotated from a first eccentric member through unidirectional couplings", thus rippled output speeds.

In U.S. Pat. No. 4,487,085, "The cam is tapered from one end to the other to permit the gear ratio of the transmission to be varied in infinite increments by adjusting the position of the cam relative to the followers." Power must pass the power through a tiny point of contact greatly limiting the power capacity of the transmission.

In U.S. Pat. No. 4,630,839, "A bicycle having pivoted level pedal system (1, 2, 45) and lever arm length or gear ratio (speed) change devices (3, 4, 5, 6)" is disclosed.

The device of U.S. Pat. No. 4,630,839 does not provide any means for removing ripple and, therefore, cannot provide seamless, ripple free outputs.

U.S. Pat. No. 6,068,570 utilizes eccentrics 14 and 25 which it refers to as cams. The eccentrics 14 and 25 cannot provide ripple free outputs. Furthermore, the transmission of U.S. Pat. No. 6,068,570 does not provide means to produce an infinite number of output speeds.

Thus, it would be advantageous to provide an infinitely variable torque multiplying, substantially constant power mechanical transmission that produces ripple free outputs, requires fewer components to assemble, is easier to manufacture, is adaptable to any prime mover providing ease of shifting, allows power shifting under load, can provide compression braking and can handle substantially more power and torque than prior art transmissions.

SUMMARY OF THE INVENTION

The instant invention includes an input shaft journaled in a restraining support or housing, one or more oscillators, two or more output levers driven by one or more oscillators. The output levers are coupled to one-way clutches on the output shaft. The throw on the output levers is by selection and infinitely variable in order to change the rotational speed of the output shaft.

In one embodiment the oscillators, levers and their respective fulcrum blocks may be rotatably coupled on a concentric shaft slidably splined on the input shaft for axial displacement relative to the fixed location of power take-offs.

In another embodiment the output slides are moveable and the oscillators are not axially moveable.

In all embodiments the movement of the power take-off members may be self powered and self locking.

Various oscillator configurations are contemplated, related but not limited to a slidable member on slide guides, wherein oscillators are adapted for back and forth linear displacement of a member along the length of those guides.

In other embodiments an oscillator may be a cam wherein a single cam will drive two levers.

In yet further embodiments two drive cams, 180° apart, may drive the two power levers.

In another configuration, each cam drives its power lever while another cam is configured to keep the drive cam follower wheel in contact with the drive cam at all times.

In yet another configuration a spring is used to keep a cam or eccentric follower wheel in contact with the cam.

In another configuration a pair of rollers journaled on the power take-off ride on the lever while a spring holds the lever in contact with these rollers.

In another arrangement rack gears on the output slide drive a pinion gears integral with overrunning clutches journaled on the output shaft.

In some embodiments a single cam drives two cam followers 180° apart kept in contact with the cam by spring forces.

Likewise, the single cam may have an inner and an outer race, with one biasing cam follower wheel riding on the outer face and another cam follower wheel riding on the inner race with two cam follower wheels journaled on each independent axle.

The instant invention may be adapted to include structures for selectively applying vector longitudinal force generated by transmission power levers directly on the cam/follower assemblies thereby power shifting the assemblies along the length of a shaft on which they are mechanically associated.

In some embodiments the instant invention may include a control slide, constrained in a groove or along guide rails attached to the transmission housing, and integral with cam follower (oscillator) slide guides and fulcrum blocks connecting rods.

In some embodiments the control slide is contoured with grooves having oppositively oriented inclined planes wherein rollers biased in cages against the oppositely angled inclined planes in the grooves function as opposed linear one-way clutches to lock the control slide to the housing or to selectively bias the rollers by moving the cage one way or the other wherein the lever forces generated within the transmission may move the control slide one way or the other, thus providing power shifting and automatic clamping.

In another embodiment the one-way clutch cavities, rollers and cages may be in the power take-offs and automatically hold the power take-offs in selected positions or allow them to be moved by interior lever forces in one direction or the other on power levers.

Screw or hydraulic positioners or the like may be used to move or to hold the control slide.

One end of the cam driven lever provides zero output speed and maximum output torque. The other end of the lever, which may extend beyond the cam drive connection, provides the maximum output speed and a smaller output torque. Thus, the instant invention is an infinitely variable constant power transmission.

In another embodiment, by not including a moveable control slide, the transmission may be used as a low cost, power dense, one or two fixed speed reducer.

In yet another embodiment cam shaped links, sans cam followers, effectively remove ripple free selected output.

DESCRIPTION OF THE DRAWINGS

These and other advantages of the present invention are best understood through reference to the drawing, of which.

DESCRIPTION OF THE INVENTION

Figure 1:
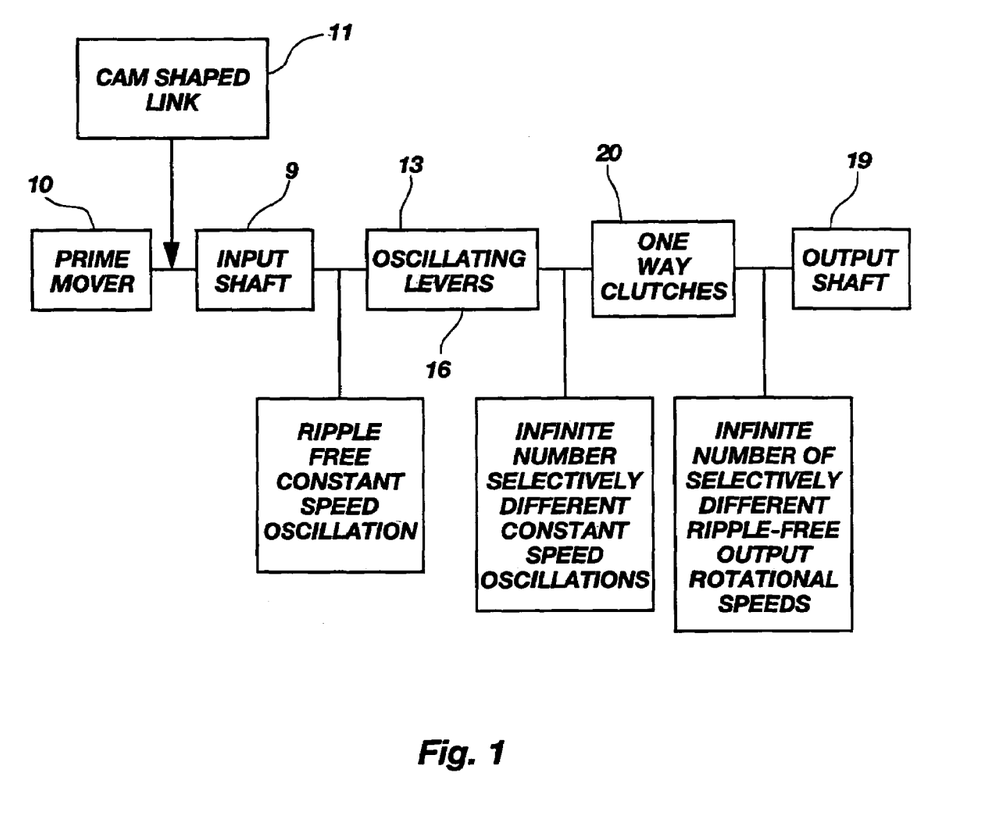
FIG. 1 is a schematic block diagram representing the basic components and their function in accordance with the principles of the present invention.

FIG. 1 is a schematic block diagram representing the basic components and their function of a transmission in accordance with the principles of the present invention comprising an input shaft 9 coupling a prime mover 10, such as electric motor, the crank of a bicycle, a motor vehicle, an internal combustion or such as a jet engine, a steam engine, or a wind turbine propeller, to an oscillator 11, which may be a self biasing cam or cam shaped link in line contact with its cam follower. Line contact between cam and cam follower deliver well over 100 times the torque, or power, than by follower wheels with rounded rims used with variable throw cams. Biased oscillators 11 are coupled to levers 13 in line contact, or equivalent, with power take-offs 14 slidably and selectively clamped on the levers 13: control means that power shift the position of the power take-off and automatically lock it in a selected place on lever 13. Power take-offs are coupled to slides, a rack gear or equivalent pinned at one end to housing and in mesh with a pinion integral with one-way clutches 20 on output shaft 19. Cams, or cam shaped links, are designed to drive at ripple free, seamless speeds the output shaft which may turn the output at an infinite number of selected infinitesimally different speeds from zero rpm to a design maximum top speed. This is a torque multiplying constant power mechanical transmission. The lower the output speed, the greater the output torque.

A first illustrated embodiment (see FIG. 2) is comprised of an input shaft 20 rotatable in a housing 21, a concentric cam shaft 22 slidably splined on input shaft 20, and two or more cams 23 fixed to cam shaft 22 said cams are contoured to provide periods of constant linear speed to cam followers 24 biased against cams 23 by a spring 25. A first cam 180° from a second cam. Two or more cam followers, comprised of follower wheels 26 rotatable on a stub shaft 6 extending from slide 27 that rides up and down just like an elevator in an elevator shaft. Guides 28 extending from blocks 29 held from rotating on rotating cam shafts 22 by guides 28 in grooves 33. Control slide 30 fixed to guides 28 receives screw 31 the shank of which extends through housing 21 via bearing 32 that restricts back and forth motion of screw 31 while allowing screw 31 to rotate. The ends of guides 28 extend from control slide 30 into grooves 33 in housing 21.

Figures 2, 3, 4, 5:
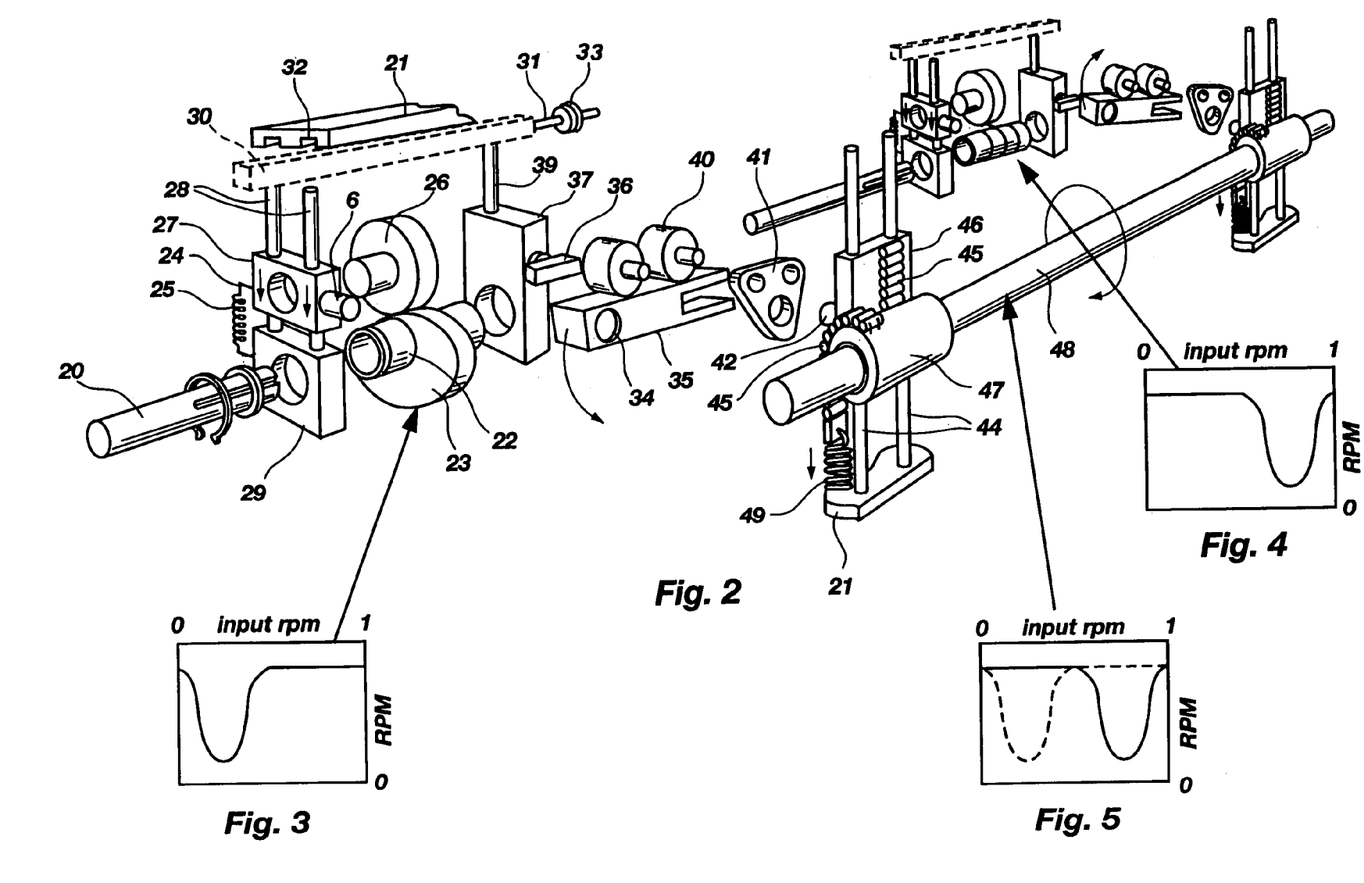
FIG. 2 is an exploded perspective of a first embodiment of a transmission with two spring biased cams in linear array in accordance with the present invention.
FIG. 3 is a graphical representation of speeds delivered from first cam to an output shaft of a transmission in accordance with the principles of the present invention.
FIG. 4 is a graphical representation of the speeds delivered from a second cam to an output shaft in accordance with the principles of the present invention.
FIG. 5 is a graphical representation of how the speed from a first cam combines on the output shaft with the speed from a second cam to provide a wide selection of selected, totally ripple free, seamless output speeds of a transmission in accordance with the principles of the present transmission.
Figure 6A:
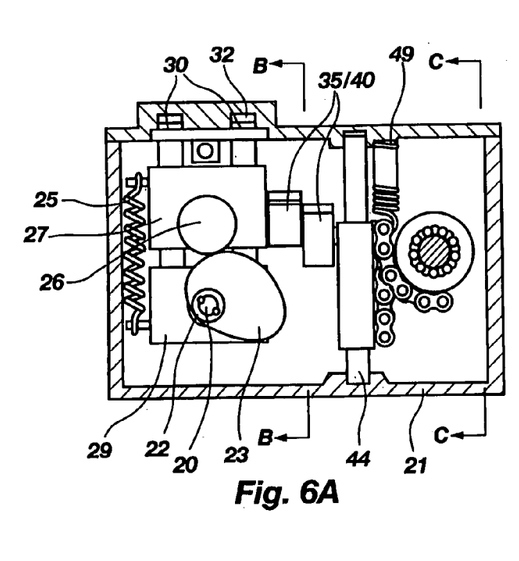
FIGS. 6A, 6B and 6C are end, right side and left side views, respectively, of the transmission of FIG. 2.
Figure 6B:
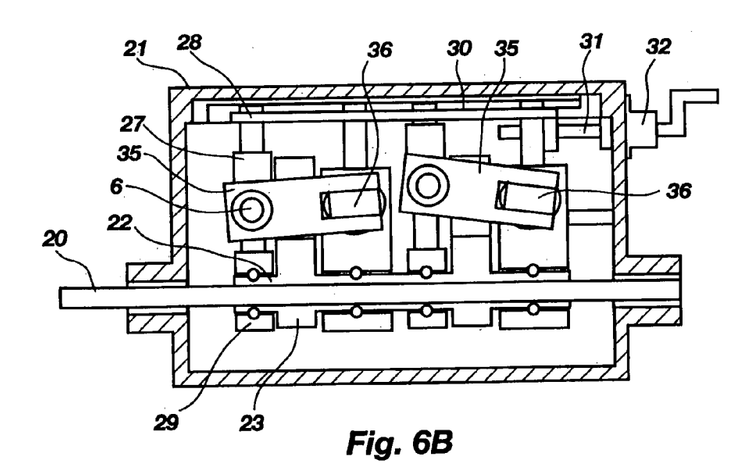
Figure 6C:
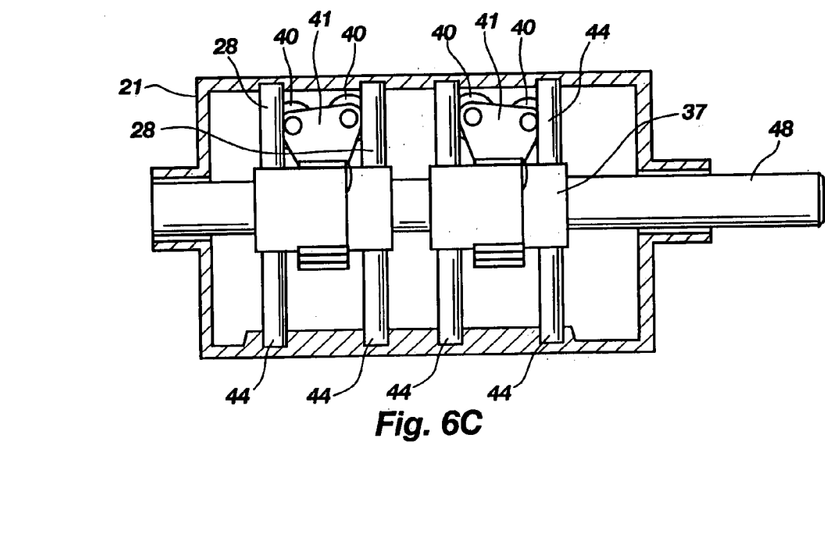

Stub shafts 6 extending from followers 24 are held by bearings 34 in levers 35 connected to fulcrums 36 extending from and rotatable in blocks 37. Cam shaft 22 is rotatable in blocks 37. Guides 39 fixed to control slide 30. Guides 39 extend from control slide 30 and ride in grooves 33 in housing 21.

Cam 23, followers 24 and fulcrum blocks 37 remain in fixed axial locations because they are so restrained by control slide 30.

The shafts of rollers 40 riding on levers 35 are press fit into links 41. Shaft 42 also press fits in link 41 extends from a bearings press fit into slide 46. Slide 46 is slidable on guides 44 fixed to housing 21.

Tension members 45 are fixed at their upper ends to slides 46 and at their other ends to one-way clutches 47 journaled on output shaft 48. Springs 49 fastened at their one end to tension members 45 are fixed at their other end to housing 21. Said tension member arrangement could be replaced by rack and pinion gearing.

In operation: Input shaft 20 rotates. It rotates cam shaft 22 and cams 23 causing cam followers 24 to reciprocate at a constant linear speed relative to the input speed during 180° of input shaft 20 rotation. First one follower 24, see FIG. 3, moves at that constant speed, then the other follower 24, see FIG. 4, moves at that same constant speed as the first follower pulled by spring 25 rewinds. Together, see FIG. 5, they provide a seamless, ripple free output from a cam and cam follower that are always in line, or equivalent, contact one with the other.

Power levers 35 rotatable on and driven by followers 24 move up and down around fulcrum pivots 36. Power take-off wheels 40 always in line contact or equivalent with levers 35 cause link 41 to rotate back and forth on slides 46. Slides 46 move up and down on vertical guides 44 fixed in housing 21, just like an elevator goes up and down in its shaft. First one is driven at a fixed speed, and then the other is driven at the same, ripple-free, seamless speed.

Since the cam assembly, including fulcrums 36 is slidably splined on the input shaft, it can be slidably displaced relative to housing 21. Thus, when fulcrums pivots 36 are in line with the centers of links 41, those links will not move up and down. When cam assemblies are moved away from fulcrums 36, links 27 begin to move at a constant speed up and down. The farther the cam assembly is moved, by control screw 31, the faster slides 46 move.

An infinite number of speeds are available.

Slides 46, fixed to one end of tension members 45 are, at their other end, fixed to over-running clutches 47 journaled on the output shaft 48. The faster slides 17 move, the faster output shaft 48 turns. Another tension member fixed to said over-running clutches connects with a spring 49 fixed to housing 21. That force also keeps power take-off wheels 40 on levers 35.

First one cam drives the output shaft, and then the other cam drives that output shaft at the same selected ripple-free, seamless output speeds.

Figure 7:
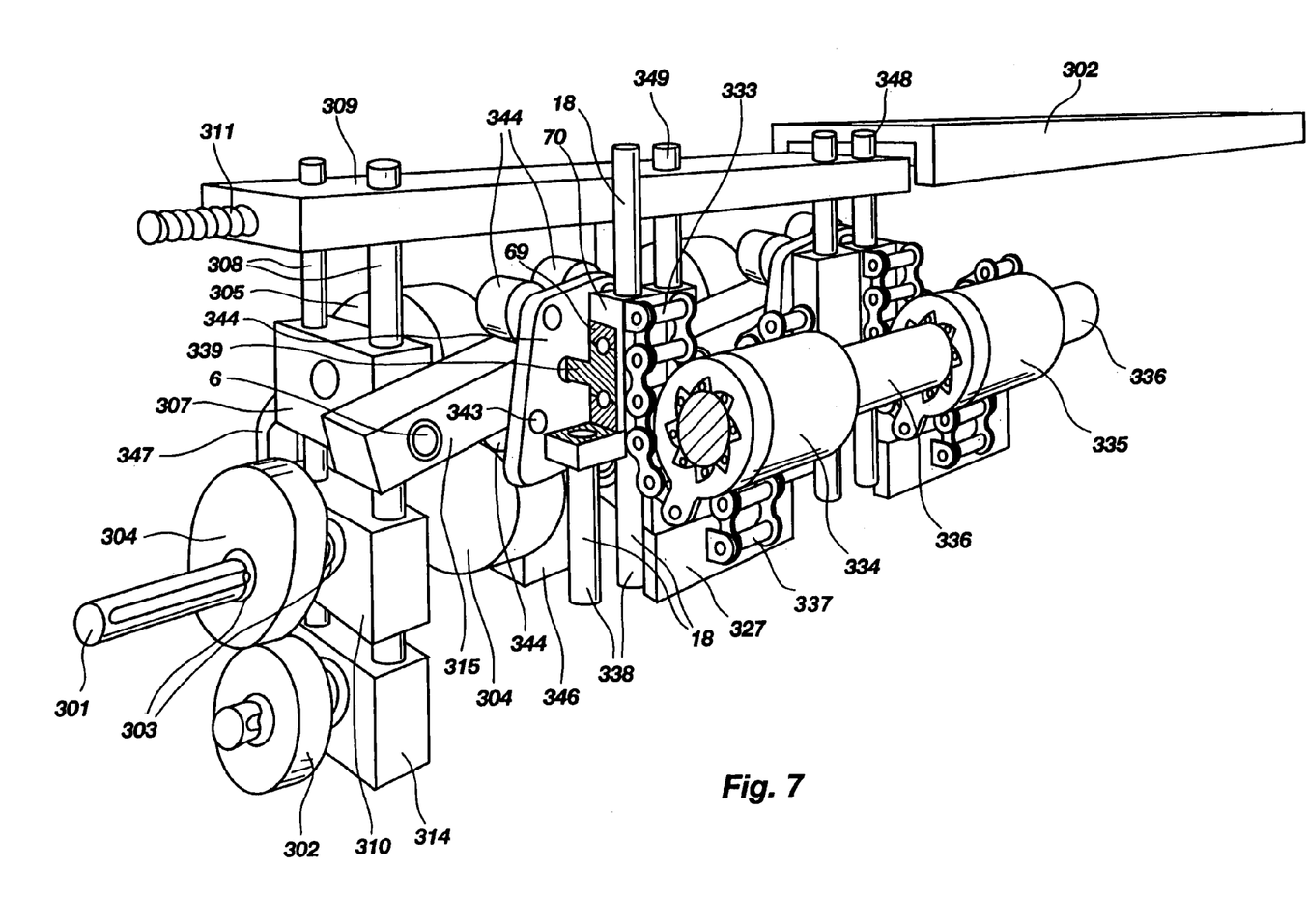
FIG. 7 is a perspective view of a second embodiment, a self biasing transmission in accordance with the principles of the present invention.

FIG. 7 shows the transmission of the invention in yet another embodiment where input shaft 301 rotatable in housing 302 is slidable in, but keyed to rotate with concentric shaft 303 rotatable in two guide blocks 310 as well as in two fulcrum blocks 346. Two drive cams 304 fixed to concentric shaft 303 drive two cylindrical cam follower wheels 305 rotatable on shafts extending one each from two cam follower slides 307 riding on guide rods 308 extending from guide blocks 310. Two cams 304, fixed to concentric shaft 303, in line contact with cam follower 307, are contoured to drive cam followers at a seamless constant speed during the first 180° of each input shaft rotation. The second cam 304 keyed 180° away from the first described cam 304, and in line contact with its cam follower wheel 305 drives its carrier 307 at the same seamless constant speed during the next 180° of input shaft rotation.

Two biasing cams 311 keyed to concentric shaft 303 and in line contact with two cam follower wheels 312 journaled on cam follower 314 slidably or ball splined on the same guides 308 as driving cam followers 304. Biasing cams 304 are contoured to always keep driving cam follower wheels 305 in contact with cams 304. Biasing cam followers 314 are fixed to driving cam followers 307 by connector 347. So that followers 314 are one with followers 307.

Stub shafts extending from followers 307 are rotatable in levers 315 pivotally pinned on fulcrum block 346. The upper and lower surfaces of levers 315 are parallel. At least two rollers 344 roll on the upper surface, at least one roller 344 rides on the lower surface of each lever 315. Roller shafts 343 are pinned to a connecting plate of power take-off 341. Center lines of shafts 339 fixed to connecting plates of power take-off 344 intersect the center lines of levers 315. Shafts 339 are rotatable in output slides 327 which ride on guides 338 fixed in and to housing 302. Tension members 333 pinned to output slides 327 wrap around and are pinned to one-way clutches 334 and 335 journaled on the transmission output shaft 336. Tension members 337 pinned to the opposite ends of output slides 327 wrap around output clutches 334, 335 and are pinned, at their other ends to those clutches. Said tension members could be replaced with rack gears in mesh with pinions on clutches 334, 335.

Control slide 309 is slidable in groove 348 in housing 302. Cam follower slides 308 and fulcrum block rods 349 extending from fulcrum block are fixed to control slide 309. Screw 3 threaded into control block 309 at its one end, its shank extending through housing 302 is rotatable, and restrained against axial motion, in housing 302. Said shank extends outside of housing. A crank, or wheel, or other mode may be used to rotate screw 3 to move the control slide to change output speed. The axial location of cam, followers and fulcrum relative to each other are fixed by control block 309 and will not change as the array is moved by said controls.

Figure 8:
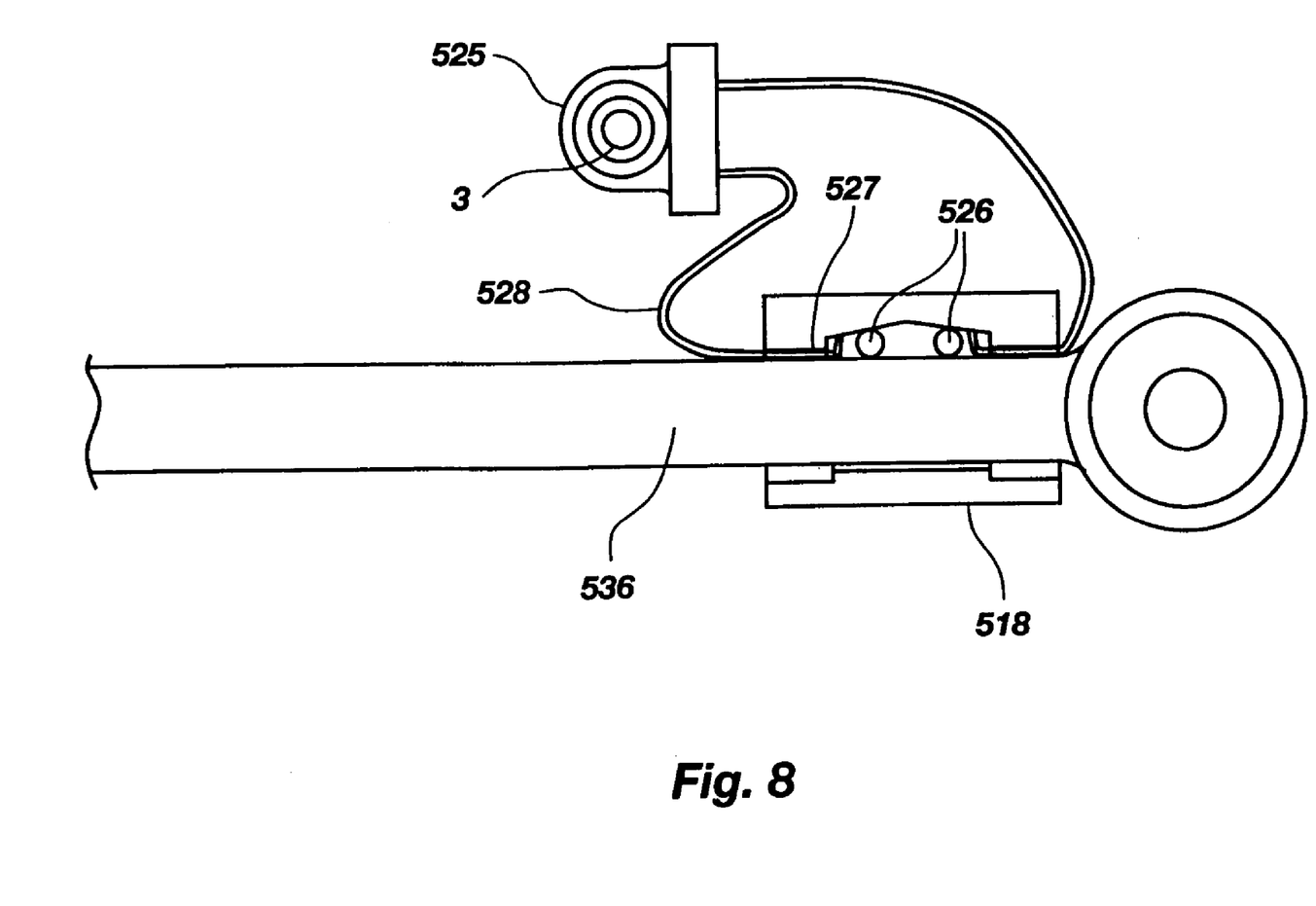
FIG. 8 is a sectional view of a power shift assembly.
Figure 9:
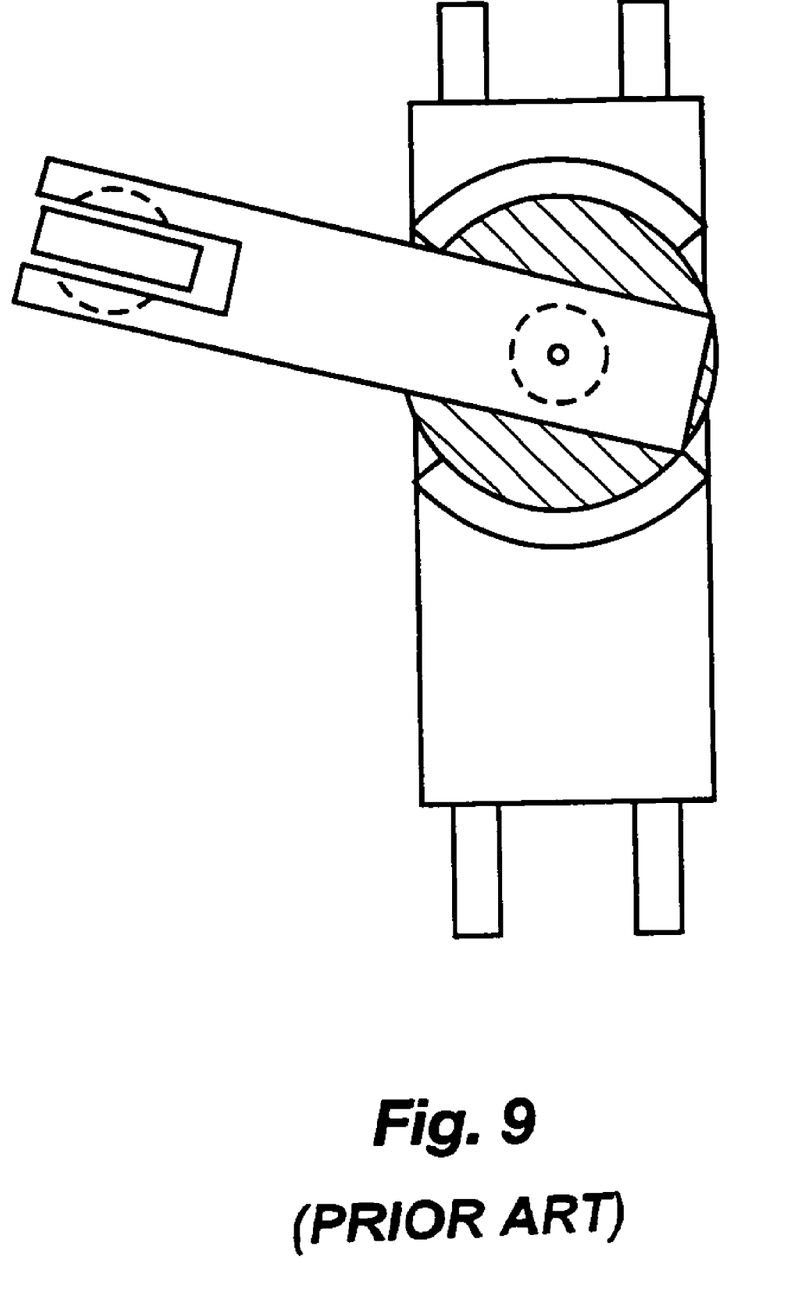
FIG. 9 is a view of a power take-off that is equivalent to the roller type power take-off in accordance with the principles of the present invention.

Screw 349 can be replaced by a self powered shift means comprised of linear opposed one-way clutches, as described in FIG. 8.

In operation, the input shaft 301 turns the concentric shaft 303 and the cams 304 fixed thereon one 180° from the other. Rotating cams 304 take turn driving followers 314 at a constant speed. While the first follower rewinds the second follower is driven by the second cam at that same constant speed. Together they provide a seamless, ripple free output from a cam and cam follower that are always in line contact, one with the other. Biasing cams 311 keep drive cam follower wheels 305 in line contact with drive cam 304 at all times. No springs are needed. Line contacts or equivalent, see FIG. 14, deliver well over 100 times the torque force of point contact from rounded rim follower wheels.

Power levers 315 rotatable on cam followers 307 oscillate up and down on fulcrum block 346. Power rollers 344 rotatable on a power take-off 341, two or more on the top surface of the lever and one or more on the bottom surface of the lever. Power take-offs 341 are journaled in output slides 327 riding on guide rods 308 fixed to housing 302. Said slides are coupled to over running clutches 334 and 335 on the output shaft by rack and pinion gearing or by tension members drive described above.

Move concentric shaft 303 assembly 350 relative to the power take-offs 340 to change transmission ratios. When the fulcrums 346 are in line with power take-offs the output speed is zero and the output torque is very large. The farther the lever is displaced from the power take-offs, the faster the output shaft turns.

Simply turn screw 311 threaded in the control 309 slide to change speeds. Or the said screw 303 can be replaced by coupling said slide via opposing one-way clutches which share the same roller cage. This latter method, see FIG. 8, moves its opposing one-way clutches effortlessly and automatically locks it in selected locations on control slide 309. When no control force is applied, the opposing one-way clutches are automatically locked in selected positions.

Figure 12:
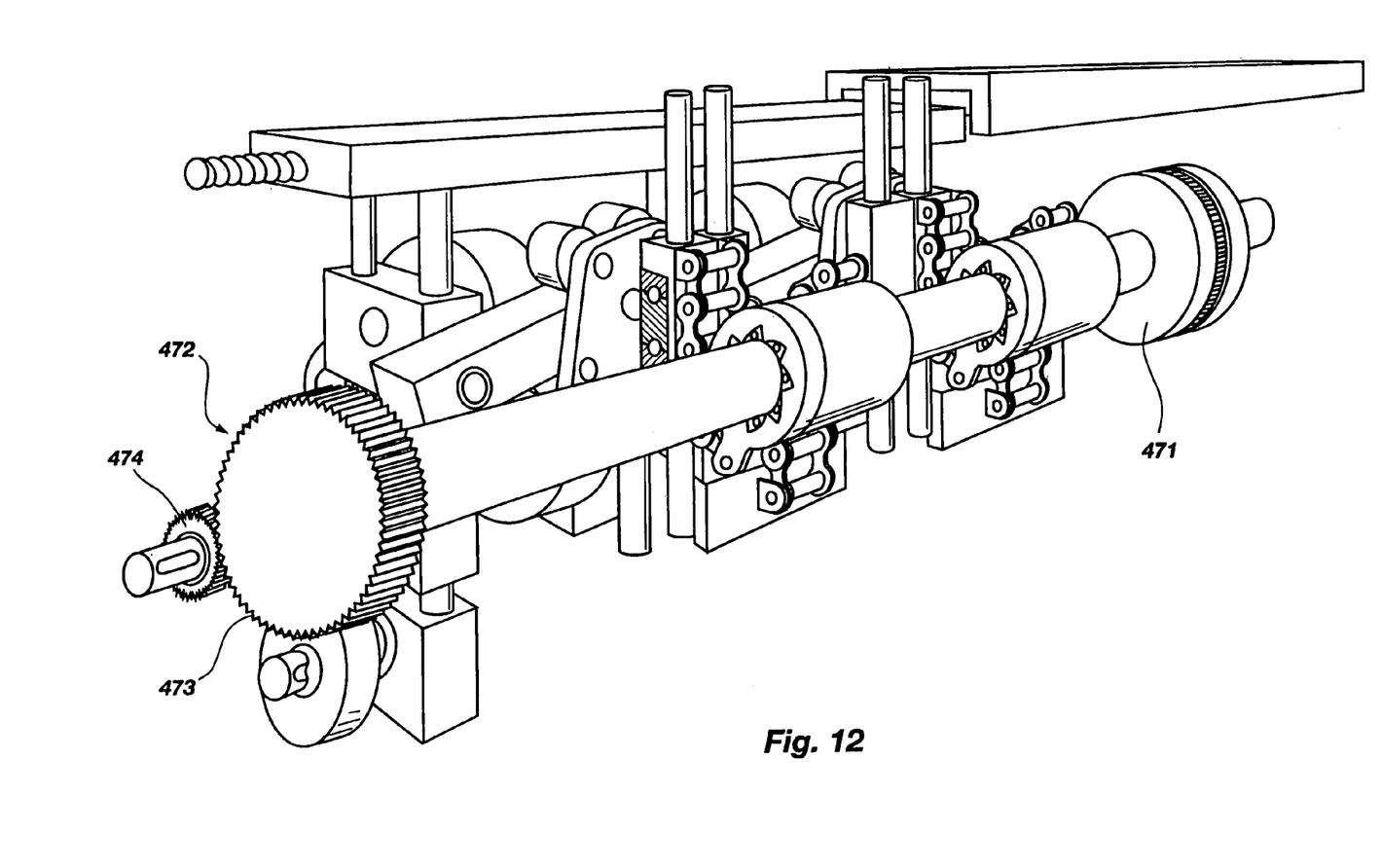
FIG. 12 is a perspective drawing of the transmission of FIG. 7 as a vehicle transmission.

FIG. 12 is a perspective drawing of the transmission for an automobile wherein the transmission of FIG. 7 is shown feeding a planetary gear set 471 designed to provide a choice of forward or reverse drive as well as park or a free neutral. Compression drive means 472 are also shown.

Figure 13:
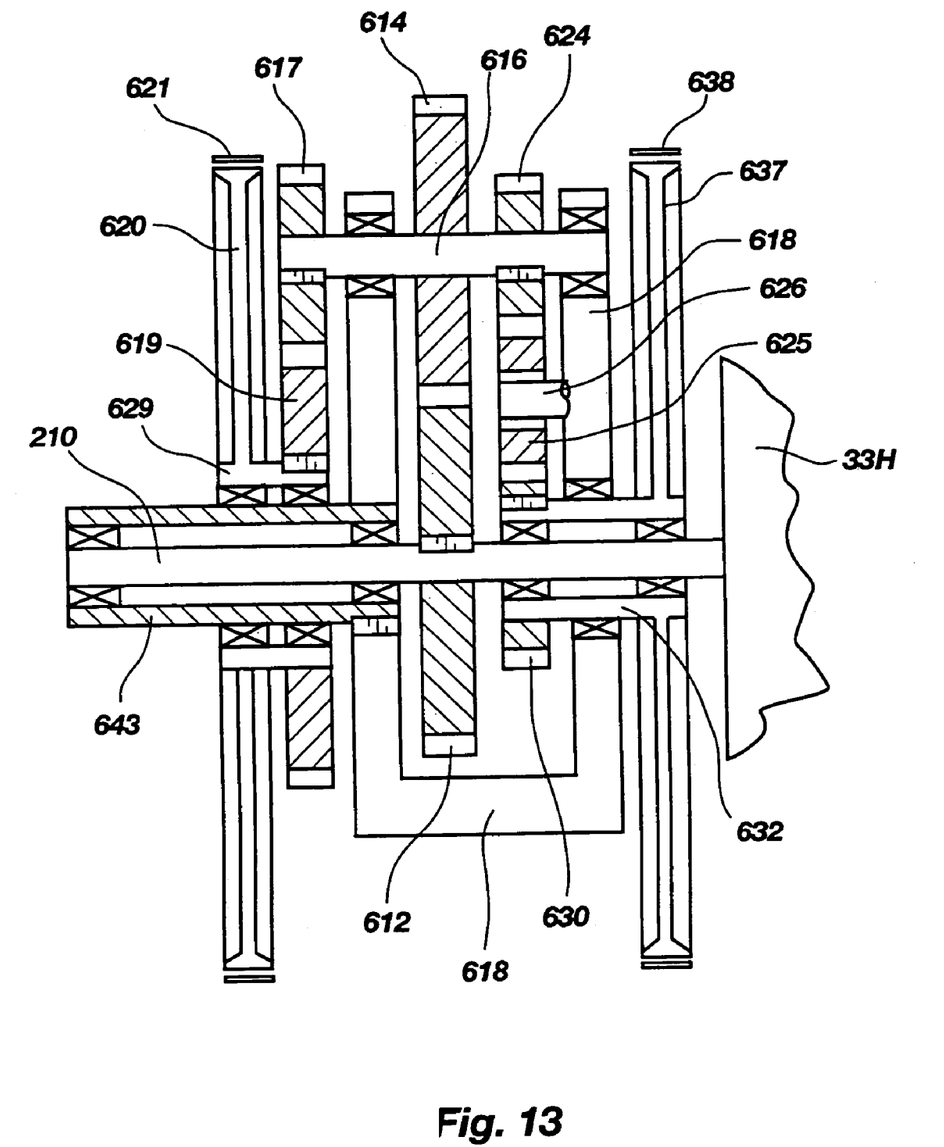
FIG. 13 is a cross-sectional side view of a planetary gear set providing selected forward, reverse, neutral and park when connected to the transmissions of this invention.

Variable speed output shaft 210 of FIG. 7 driven by one-way clutches of the transmission of FIG. 7 planetary gear set 411, wherein gear 612 fixed to shaft 210 meshes with gear 614, fixed to jack shaft 616. Jack shaft 616 rotatable in carrier 618 fixed to output shaft 643. Pinion 617 fixed to jack shaft 616 meshing with gear 619, fixed to concentric shaft 629. Brake drum 620 fixed to shaft 629 engages brake band 621, controlled by the transmission operator. Pinion 624 fixed to jack shaft 616 and in mesh with idler gear 625, rotatable on stub shaft 626, extending from and integral with carrier 618. Idler 625 in mesh with gear 630, keyed to shaft 629, fixed to brake drum 637. Brake drum 637 is engageable with brake band 638.

In operation, brake bands 621 and 638 are free from drums 620 and 637, and the transmission is in neutral. Tightening band 621 holds gear 619 still. Input gear 612 on shaft 210 is in mesh with gear 614, which is fixed to jack shaft 616 and which rotates gear 617, which then rolls around held gear 619 causing carrier 618 to rotate output shaft 643 in a reverse direction.

Releasing break band 621 and tightening brake band 638 stopping brake drum 637 causes jack shaft 616 to rotate carrier 618, fixed to output shaft 643 in a forward direction. When both brake bands 621 and 638 are tightened, the transmission is in park.

Compression braking means are comprised of gear 473 coupled by a one-way clutch to output shaft 336, of the transmission of FIG. 8. Gear 473 is in mesh with gear 474 fixed to the engine shaft, which is the transmission input shaft. When gear 474 is driven faster than engine speed by gear 472 we have compression braking.

Figure 10:
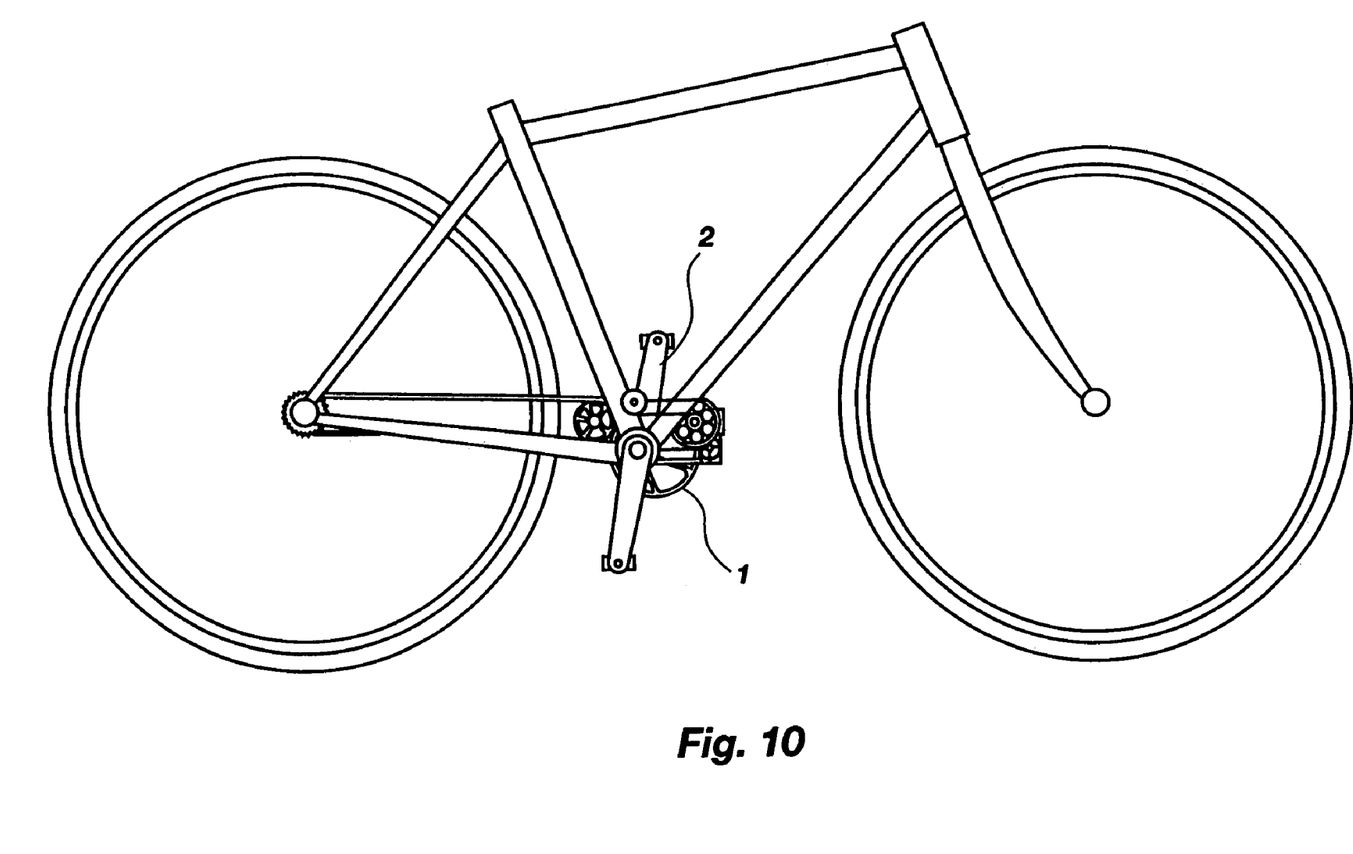
FIG. 10 is a side view of a bicycle of the present invention installed as a bicycle transmission.
Figure 11A:
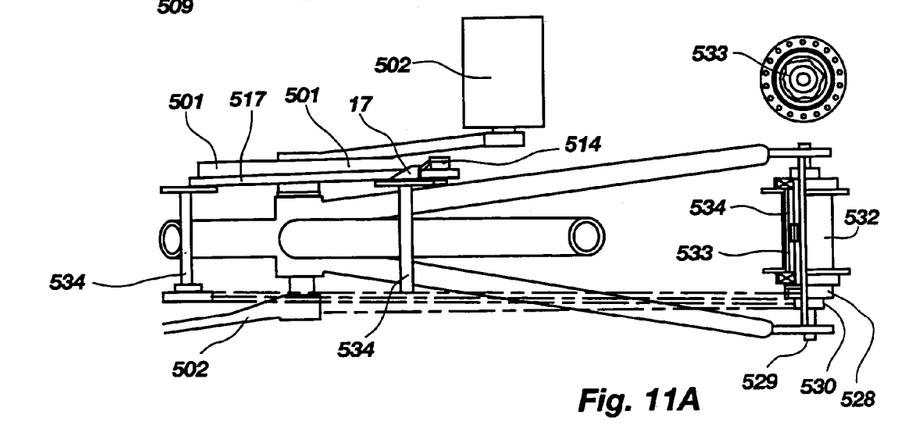
FIGS. 11A, 11B and 11C are left side, top and right side views of a third embodiment of a transmission in accordance with the present invention used as a bicycle transmission.
Figure 11B:
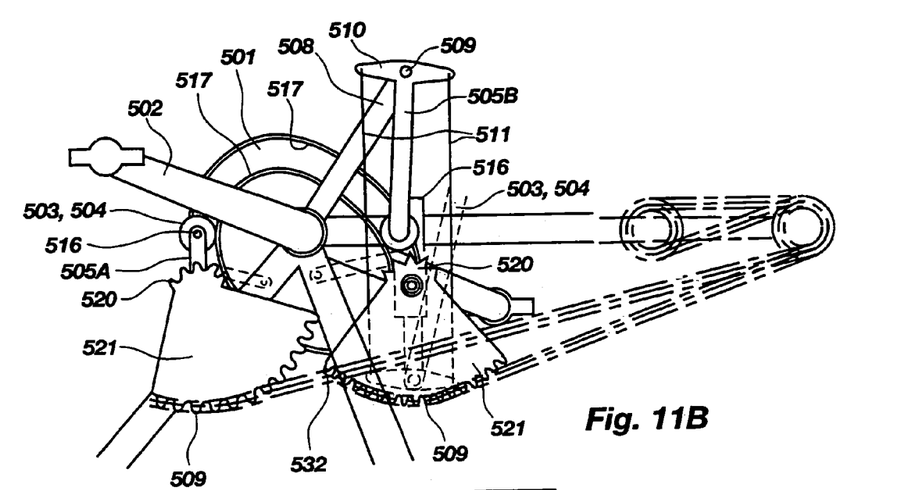
Figure 11C:
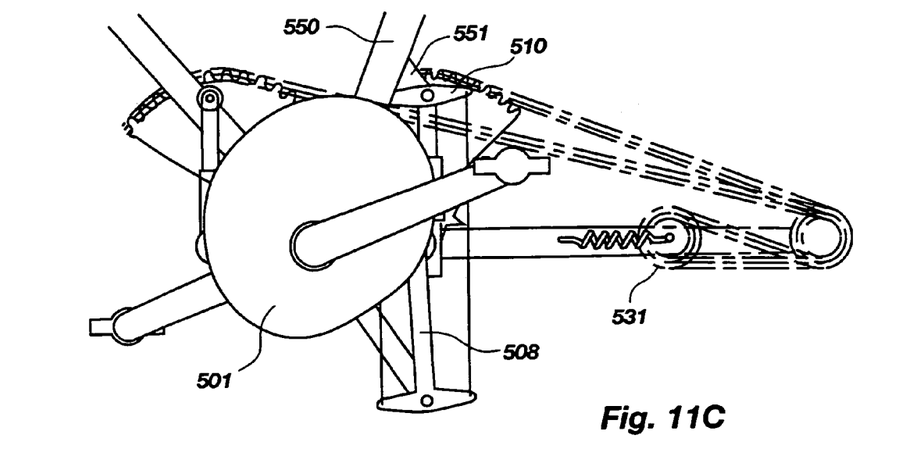

In yet another configuration, a bicycle type transmission that is self biasing, infinitely variable, torque multiplying and that never needs to move a chain from one sprocket to another to change speed rotors is disclosed. FIG. 10 shows an illustration of the transmission in a bicycle. FIG. 11A is a top view of the transmission. FIG. 11B is a left hand view and FIG. 11C is a right hand view where a self biasing cam 501 driven by pedals 502 drives cam followers 505A and 505B pinned to bike frame 50. Cam follower wheels 504 ride on the inner race of cam 501. Cam 501 is designed to produce a ripple free, constant speed rotation of follower 505A during the first 180° of pedal rotation and the same ripple free, constant rotation of follower 505B in reverse during the next 180° of pedal rotation.

Biasing cam follower wheel 514 in contact cams outer race 517 is designed to keep follower wheels 504 on cam 501. Follower wheels 514 are independently journaled on shaft 516 fixed to and extending from followers 505A and 505B. Cam follower 505A fixed to transfer shaft 509 journaled in tab welded to bicycle frame 50 is fixed at its other end to beam lever 518. Bicycle frame extension 508 has walking beam extensions 510 connected by rods or cable 511 to a similar walking beam extensions 510 rotatably fixed to transfer shaft on one end rotatable in tabs 511 extending from bike frame 50 at its other send. Said walking beam is integral with beam 518. Power take-offs 519 slidable splined on beam 518 has shafts 509 extending therefrom that journal cluster sprockets 521 comprised of a small sprocket fixed to a larger segment sprocket 521.

Power take-offs 519 with opposed linear over-running-clutches, see FIG. 8, comprised of rollers 523 in cage 524 biased against inclined planes of cavities 525 in power take-offs 519 slidable on beams 518. Control cable 526 fixed to one end of cage 524 extends to twist grip, or control lever, on the handle bars of the bike. Another control cable 526 is fixed to the other end of cage 524 and at its other end to the same twist grip or lever. Move the twist grip or lever one way and the power take-off, impelled by interior transmission forces, moves that way. Move the twist grip, or lever, the other way and the power take-off moves the other way.

Short segments of chain are pinned to bike frame 50. Their other end is fixed to and wraps around small sprockets 520, fixed to larger sprocket 521 segments. Roller chain 522 fixed to front sprocket segment 521 extends to rear sprocket 528 journaled on rear axle 529 fixed to bike frame 50 and then to lightly spring loaded idler 531 on rear fork of frame 50 and then back to and around sprocket 528 journaled on axle 529 and then back to the other larger sprocket segment 521 where it is pinned.

The hub 532 of the bicycle's rear wheel is journaled on rear axle 529. That hub is the outer race of roller clutches with wedge shaped cavities 533 and 534. Rollers 30 in cages 31 are biased against the inclined plan of the wedge shaped cavity.

In operation, when the pedal is pushed down the cam rotates. When the cam rotates cam follower 505A oscillate. Cluster sprockets 521 journaled on power take-offs 519 are selectively positioned on beams 518. Cluster sprockets 521 turned by chains fixed to bike frame 50 on their one end and to the smaller sprocket of cluster sprocket 521 on its other end turn larger sprocket segment 521 coupled by chain 22 to rotate rear wheel sprocket 528. A walking beam cam follower 505B pinned to bike frame 50 coupled to a walking beam lever 552 oscillates in reverse. Cluster sprockets 521 selectively positioned on beam 552 is coupled by chain 22 to the other rear wheel sprocket. Both rear wheel sprockets are fixed to inner races of one-way clutches in rear wheel hub. First one rear wheel sprocket drives the rear wheel, and then the other rear wheel sprocket drives the rear wheel. The speed of the rear wheel depends on the selected position of the power take-offs on oscillating beams 522. Power shifting is effortless. When the twist grip is turned one way, roller 523 is held away from inclined plane of cavity 525 and internal transmission forces can push the power take-off in that direction. The other roller 523 remains biased to the inclined plane in its cavity 525 to keep power take-off from moving in the opposite direction. When the twist grip is turned the other way clutch roller 523 is held away from the opposite inclined plan in its cavity 525 allowing interior transmission forces to then move the power take-off in the opposite direction. When the twist grip is held still, rollers 523 are biased against both inclined planes and the power take-off is held fast to beam levers.

The walking beams could be replaced with idler sprockets.

The invention claimed is:

1. A transmission, comprising:
   an input member;
   an output member;
   at least two cam followers;
   at least two camming devices coupled to and rotatable by said input member, said at least two camming devices each contoured to provide substantially constant linear speed to said output member over a portion of rotation of each of said at least two camming devices;
   at least two levers each having a fulcrum and each coupled to at least one of said at least two cam followers in a manner that causes said at least two levers to oscillate upon movement of said at least two cam followers, said at least two levers oscillating out of phase;
   at least one clutching mechanism coupled between said at least two levers and said output member, where oscillation of said at least two levers drives said clutching mechanism causing substantially ripple free rotational movement of said output member;
   at least two selectively positionable power take-offs, each being coupled to, oscillatable by and moveable along a length of one of said at least two levers, wherein movement of said at least two power take-offs relative to said at least two levers changes the position of said at least two power take-offs relative to a respective fulcrum of said at least two levers such that when said power take-offs are positioned proximate the fulcrums of said at least two levers, rotation of said input member causes oscillation of said at least two levers and zero rotational speed of said output member, the output speed of the output member increasing as the at least two power take-offs are selectively positioned away from the fulcrums.

2. The transmission of claim 1, wherein said at least two cam followers are in line contact with said at least two camming devices.

3. The transmission of claim 1, wherein said camming device comprises a cam shaft having at least one drive cam thereon, each of said at least two cam followers coupled to said at least one drive cam and to one of said at least two levers, such that movement of said at least two cam followers relative to said cam shaft causes oscillation of said at least two levers.

4. The transmission of claim 3, further comprising biasing means associated with said at least two cam followers for biasing said at least two cam followers into line contact with said at least one drive cam.

5. The transmission of claim 4, wherein movement of said corn shaft, at least two cam followers and said at least two levers relative to a longitudinal axis of said input shaft changes the rotational speed of the output shaft.

6. The transmission of claim 3, wherein said cam shaft comprises a concentric shaft slidably splined on said input member and wherein said at least two cam followers and said at least two levers are selectively movable with said cam shaft.

7. The transmission of claim 1, wherein said at least two levers comprise a first lever and a second lever that oscillate in opposing directions upon rotation of said input member.

8. The transmission of claim 1, further comprising a control mechanism coupled to said power take-off, said control mechanism being controllable by a user to selectively alter the rotational speed of the output member.

9. The transmission of claim 1, wherein said clutching device comprises a pair of one-way clutches.

10. A transmission, comprising:
an input shaft;
a pair of cams coupled to said input shaft;
a pair of cam followers, each in line contact with one of said pair of cams;
at least two oscillating members, each pivotable about a fulcrum and each coupled to one of said pair of cam followers such that rotation of said input shaft causes at least partial out of phase oscillation of said at least two oscillating members;
at least two clutching devices each coupled to at least one of said at least two oscillating members;
an output shaft coupled to said at least two clutching devices, said output shaft being driven by oscillation of said at least two oscillating members which in turn drive said at least two clutching devices to rotate said output shaft in a substantially ripple free manner;
a first selectively positionable power take-off coupled to said first lever and a second selectively positionable power take-off coupled to said second lever, wherein adjustment of said first and second power take-offs relative to said first and second levers causes a proportional change in the rotational speed of said output shaft, whereby positioning said first power take-off at the fulcrum of said first lever and positioning said second power take-off at the fulcrum of said second lever causes zero rotation of said output shaft as said first and second levers are oscillating, the output speed of the output shaft increasing as the at least first and second power take-offs are selectively positioned away from the fulcrums.

11. The transmission of claim 10, wherein rotation of said input shaft causes rotation of said pair of cams.

12. The transmission of claim 10, further comprising biasing means associated with said at least two cam followers for biasing said at least two cam followers into contact with said pair of cams.

13. The transmission of claim 10, wherein said at least two oscillating members comprise a first lever and a second lever that oscillate in opposing directions upon rotation of said input shaft.

14. The transmission of claim 10, further comprising a control mechanism coupled to said first and second power take-offs, said control mechanism being controllable by a user to selectively alter the rotational output of the output shaft.

15. The transmission of claim 10, wherein said pair of cams are coupled to a cam shaft, said cam shaft being slidably splined on said input shaft and wherein said pair of cam followers and said at least two oscillating members are selectively movable with said cam shaft.

16. The transmission of claim 15, wherein movement of said cam shaft, pair of cam followers and said at least two oscillating members relative to a longitudinal axis of said input shaft changes the rotational speed of the output shaft.

17. A transmission, comprising:
an input shaft;
an output shaft;
at least two oscillators, each configured to provide select constant output speed of said output shaft driven by said input shaft;
at least two oscillator followers, each coupled to one of said at least two oscillators and moveable thereby;
at least two levers, each coupled to one of said at least two oscillator followers for movement thereby, each of said at least two levers being pivotable about a fulcrum and each of said at least two levers oscillating out of phase;
means for coupling said at least two levers to said output shaft to rotate said output shaft at substantially constant rotational speed upon movement of said at least two levers; and,
at least two slide members, each coupled to one of said at least two levers for movement of said at least two slide members along with the movement of said at least two levers, said at least two slide members driving said output shaft in a substantially ripple free manner, wherein translation of said at least two levers relative to said slide members varies a rate of rotation of said output shaft relative to said input shaft, said rate of rotation being constant for a given position of said at least two levers relative to said slide members and wherein said rate of rotation of said output shaft is zero when said at least two slide members are positioned at the fulcrums of their respective levers of said at least two levers.

18. The transmission of claim 17, wherein said at least two oscillating members comprise a cam shaft having a pair of drive cams thereon and wherein said at least two oscillator followers comprises at least two cam followers in line contact with said at least two drive cams and each coupled to one of said at least two levers, such that movement of said at least two cam followers relative to said cam shaft causes corresponding oscillation of said at least two levers.

19. The transmission of claim 18, further comprising biasing means associated with each of said at least two cam followers for biasing said at least two cam followers into contact with its respective said at least two drive cams.

20. The transmission of claim 18, wherein said cam shaft comprises a concentric shaft slidably splined on said input shaft and wherein said at least two cam followers and said at least two levers are selectively movable with said cam shaft.

21. The transmission of claim 20, wherein movement of said cam shaft, said at least two cam followers and said at least two levers relative to a longitudinal axis of said input shaft changes the rotational speed of the output shaft.

22. The transmission of claim 17, wherein said at least two levers comprises a first lever and a second lever that oscillate in opposing directions upon rotation of said input shaft.

23. The transmission of claim 17, further comprising at least two selectively positionable power take-offs, each coupled to one of said at least two levers, wherein adjustment of said at least two power take-offs relative to said at least two levers causes a proportional change in the rotational speed of said output shaft.

24. The transmission of claim 23, further including a control mechanism coupled to said at least two power take-offs, said control mechanism being controllable by a user to selectively alter the rotational output of the output shaft.

25. The transmission of claim 17, wherein said input shaft is coupled to the engine of an automobile.

* * * * *